United States Patent
Ibitayo et al.

(10) Patent No.: US 6,856,995 B1
(45) Date of Patent: Feb. 15, 2005

(54) METHOD FOR ENUMERATING DATA PAGES IN A STATELESS, DISTRIBUTED COMPUTING ENVIRONMENT

(75) Inventors: Kemi Y. Ibitayo, Euless, TX (US); Joey Levi, Dallas, TX (US); Dwayne T. Smith, Coppell, TX (US); James B. Tucker, Lewisville, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 422 days.

(21) Appl. No.: 09/796,191

(22) Filed: Feb. 28, 2001

(51) Int. Cl.[7] .............................................. G06F 17/00
(52) U.S. Cl. .......................................... 707/102; 707/2
(58) Field of Search ............................... 707/1–10, 102; 713/100; 709/200–250

(56) References Cited

U.S. PATENT DOCUMENTS

| | | | |
|---|---|---|---|
| 5,970,490 A | * | 10/1999 | Morgenstern ................ 707/10 |
| 6,038,565 A | * | 3/2000 | Nock .......................... 707/101 |
| 6,094,655 A | * | 7/2000 | Rogers et al. ................. 707/10 |
| 6,175,837 B1 | * | 1/2001 | Sharma et al. ........... 707/103 Y |
| 6,453,312 B1 | * | 9/2002 | Goiffon et al. ................ 707/3 |
| 6,557,100 B1 | * | 4/2003 | Knutson ..................... 713/100 |
| 6,581,088 B1 | * | 6/2003 | Jacobs et al. ............... 718/105 |
| 6,591,272 B1 | * | 7/2003 | Williams .................... 707/102 |

* cited by examiner

*Primary Examiner*—Greta Robinson
*Assistant Examiner*—Sathyanarayan Pannala

(57) ABSTRACT

The present invention discloses a method for enumerating data pages in a stateless, distributed computing environment. A user operating a uses interface calls a stateless application, which in turn invokes a stateful data structure to retrieve data from a datastore. Stateful data residing within the stateful data structure is converted to stateless data, and a display page comprising stateless data is returned to the user. Preferably, the stateless application and the stateful data structures are Enterprise JavaBeans (EJB) compliant session beans. In a preferred embodiment, a servlet generates the display page by retrieving the stateless data from the stateful session bean, the display page is returned to the user interface via a communication framework, and data is retrieved from the datastore via a persistence framework.

10 Claims, 4 Drawing Sheets

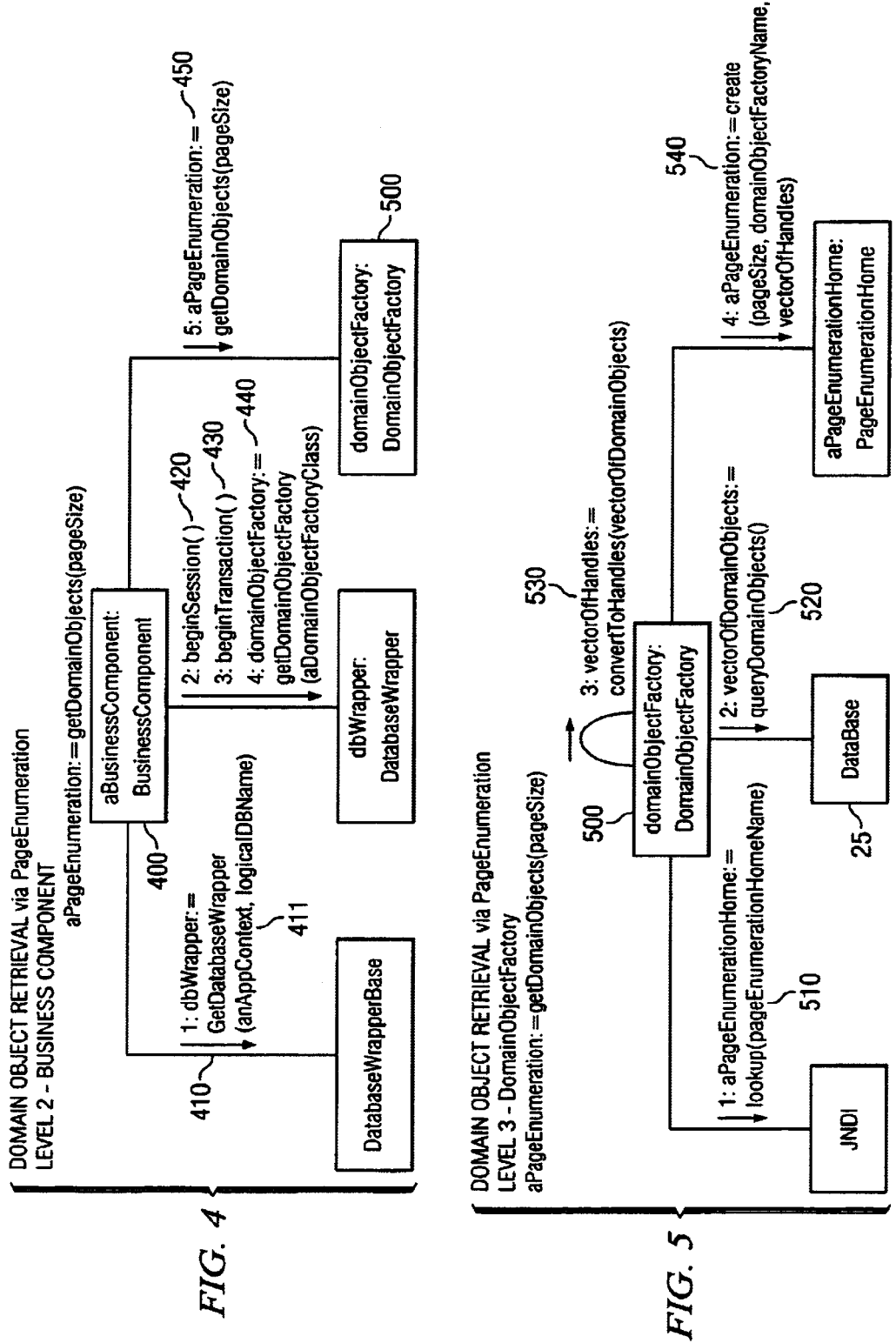

METHOD FOR ENUMERATING DATA PAGES IN A STATELESS, DISTRIBUTED COMPUTING ENVIRONMENT

BACKGROUND OF THE INVENTION

The present invention is a computer software method for enumerating pages of data in a stateless, distributed environment, and more specifically the invention allows a user to easily navigate through a large collection of data objects.

Enterprise-wide computing systems are often distributed computing systems, that is systems of individual computers, typically dispersed geographically across many separate office locations, linked together via a network to pass data and commands. A client/server arrangement is one way of implementing a distributed computing system. In a client/server arrangement, the server computer provides a service, for example reading and writing data in a database, to its client computer. Typically, the client computer calls the server computer and requests that an application or function be executed. During the session of the call, the client and server computers are said to share "state," that is the data and commands passed between the client and server have a context or state of being based upon the particular instance of service being provided to the client by the server. In a stateless distributed computing system, client and server computers maintain little or no state between calls, which works well for small, discrete transactions but poses problems when a client requests large data sets from a server. For example, the client could retrieve all of the desired data comprising a large data set from the server in a single call, but a user accessing the client computer would have to wait for the entire data set to be gathered and transmitted. Depending upon the size of the data set, for example a customer list for a major corporation, the wait time can be prohibitive. Alternatively, the client could manage context information between successive calls to the server. However, the server, being stateless, would have to rebuild the entire data set for each successive call and then search for the next subset of data to return to the client, which is inefficient and results in response delays. The present invention addresses the need for a data structure to allow clients to efficiently access large data sets from servers in a stateless, distributed computing environment.

SUMMARY OF THE INVENTION

The present invention discloses a method for enumerating data pages in a stateless, distributed computing environment. A user operating a user interface calls a stateless application, which in turn invokes a stateful data structure to retrieve data from a datastore. Stateful data residing within the stateful data structure is converted to stateless data, and a display page comprising stateless data is returned to the user. Preferably, the stateless application and the stateful data structures are Enterprise JavaBeans (hereinafter referred to as "EJB") compliant session beans. In a preferred embodiment, a servlet generates the display page by retrieving the stateless data from the stateful session bean, the display page is returned to the user interface via a communication framework, and data is retrieved from the datastore via a persistence framework.

DESCRIPTION OF THE DRAWINGS

FIG. 4 is a block diagram of steps of the invention from a business component perspective level.

FIG. 5 is a block diagram of steps of the invention from a domain object factory perspective level.

DETAILED DESCRIPTION OF THE INVENTION

Figure 1:
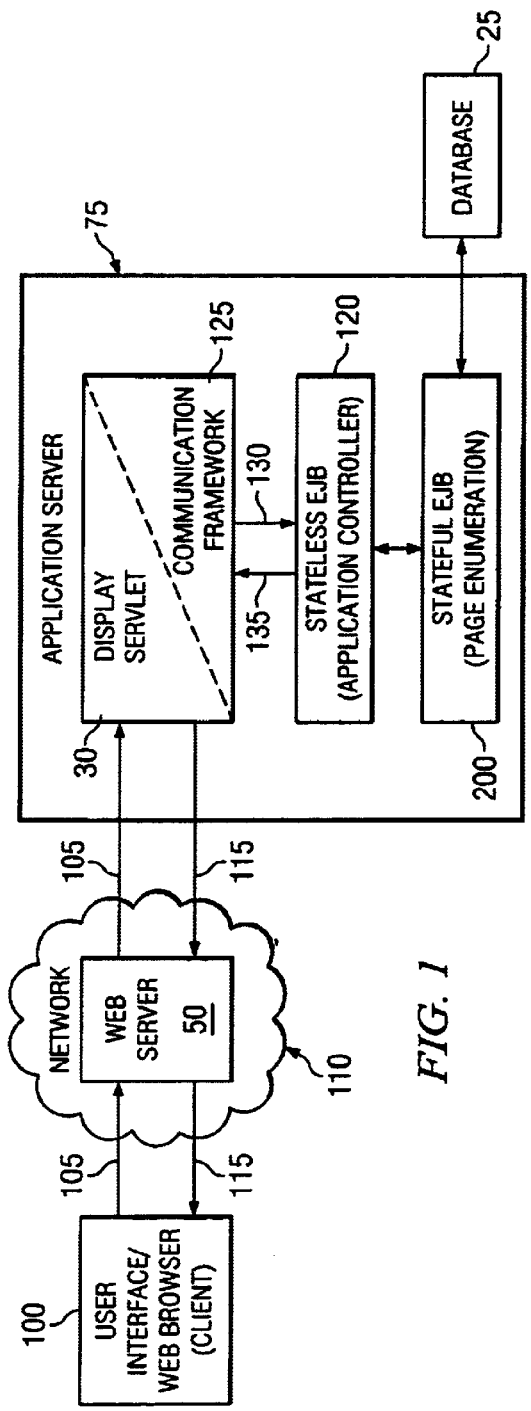
FIG. 1 is a block diagram of a distributed computing environment implementing the present invention.

Referring to FIG. 1, user interface 100 (i.e., a workstation) is connected to application 120 (also referred to as an application controller) via network 110. The network connection can be any suitable type of network connection, for example an internet session, wherein user interface 100 comprises a web browser accessing a web server 50, which in turn is linked to an application server 75 hosting application 120. Application 120 may be any type of stateless, executable software or program, for example a database access program such as a pre-existing legacy application. Stateless application as used herein means that the application does not recall or remember attributes, parameters, configurations, and the like from any previous time the application was executed. Preferably, application 120 is written using the FJH industry specification, which is implemented in software packages available from Sun Microsystems, IBM, and other companies. More preferably, application 120 is a slateless session bean, which is an enterprise bean that is created by a server and exists only for the duration of a single client/server request to perform operations such us calculations or accessing a database for the client. Use of stateless applications is desirable to avoid the problems an application server would encounter in trying to implement a stateful application, for example the burden of tracking, maintaining and storing the data (i.e., the "state") associated with each and every client call handled by the server.

Upon establishing the internet connection between the user interface and the application, the user can provide input 105 to the application. For example, a user might need to by perform a business task such as updating a client's account information using an account manager application and a datastore (i.e., database 25) residing on a backend server. The user could identify the task and application by sending the corresponding uniform resource locator (URL) as input 105.

Datastore as used herein means any type of data storage software device or medium, including datafiles, databases, memory chips, hard drives, floppy drives, magnetic storage media, optical storage media, and the like. Preferably, the datastore is a database, which can be either a relational or object database. Examples of suitable databases arm relational databases produced by Oracle. Inc. and object databases produced by Versant Inc. The datastore can be located remotely and accessed, for example, through a JAVA database connectivity (JDBC) compliant connection. When the underlying datastore comprises a relational database, object-relational (O-R) mapping tools, such as TOPLink produced by The Object People, Inc., may be used in carrying out the invention. As known to those skilled in the art, O-R mapping tools serve as a bridge between object technology and relational database technology. Likewise, the JAVA/Versant interface (JVI) available from Versant Inc. can be used in carrying out this invention to serve as a bridge between the JAVA programming language (which is available from Sun Microsystems Inc.) and object databases produced by Versant Inc.

The task the user seeks to perform may comprise a number of individual steps, each of which may require additional input 105 to application 120 (via servlet 30 and communication framework 125) from the user interface. The sequence of the steps to perform a task is controlled by application 120. Subsequent steps should follow in a logical, ordered sequence as necessitated by the task being performed, and the computer application typically contains the underlying logic controlling the step sequence. The user navigates through the various steps by supplying input 105 to the application (also referred to as navigational or progressional input) in response to information and prompts (i.e., output 115) communicated by the application to the user via the user interface.

Servlet 30 and communication framework 125 work together to generate output 115 to user interface 100. A servlet is a program written in the JAVA programming language that extends the functionality of a web server, generating dynamic content and interacting with web clients using a request-response paradigm. A preferred communication framework 125 for managing communication flow between user interface 105 and application 120 is disclosed and claimed in co-pending U.S. patent application Ser. No. 09/671,981, filed Sep. 27, 2000 and entitled "Computer Software Framework and Method for Managing Communication Flow Between a User Interface and a Computer Application," which is incorporated by reference herein in its entirety. Communication framework 125 abstracts the communication (i.e., presentation) functions from the business process functions/logic. Communication framework 125 receives input 105 from user interface 100, which comprises a navigational input, and optionally additional task specific information (for example, a personal identification number, account number, etc.). Communication framework 125 queries application 120 (as represented by line 130) and receives information from application 120 (as represented by line 135) regarding the identity of the current step in the task corresponding to the navigational input from the user. Based upon the identity of the current step, communication framework 125 provides output 115 corresponding to the client step to user interface 100 across network 110.

Figure 3:
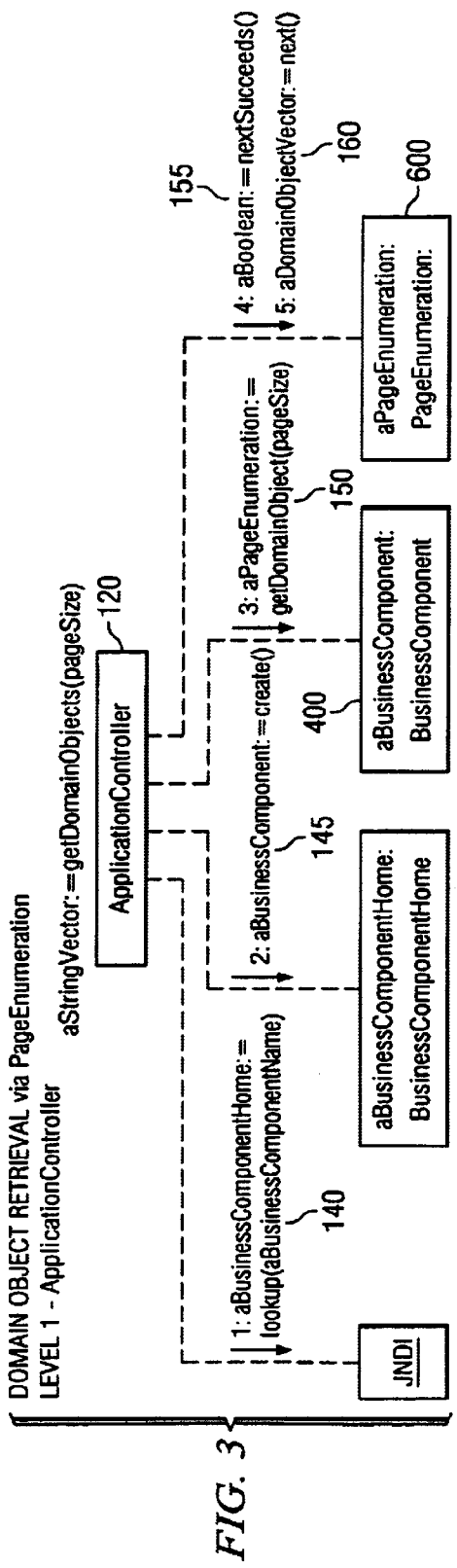
FIG. 3 is a block diagram of steps of the invention from an application controller perspective level.

In order to update an account, the first step might be to determine whether the account is a new or existing account, and thus the user would enter this information, if known. If unknown, a preliminary database search step may need to be executed by application 120 to determine if an account exists, wherein a large data set is accessed from database 25. Referring to FIG. 3, application controller 120 executes the appropriate business component associated with the step of searching for a list of customer accounts, for example a business component named "list customer accounts" that searches a database named "customer account database." The application controller looks-up the appropriate business component in a JAVA Naming and Directory Interface (JNDI) (as represented by step 140) and creates the business component (as represented by step 145), for example by instantiating a business component object. In order to avoid the problems discussed previously, the business component (on behalf of slateless application controller 120) invokes a stateful data structure to allow efficient access to such a large data set, as represented by step 150. The preferred stateful data structure used in carrying out the current invention is a page enumeration session bean 200 (also referred to generally as the page enumeration or page enumeration framework), which is a stateful session bean.

Prior to creating the page enumeration session bean, the business component must gather information and parameters needed for the creation of the page enumeration session bean. Referring to FIG. 5, the business component looks up the page enumeration in a JNDI, as represented by step 510. In addition to identifying the appropriate page enumeration, the business component must also gather from the relevant database the preliminary information and parameters (i.e., page enumeration set-up information) that will be used to create the page enumeration. For example, the business component might establish a database session with the customer accounts database to determine how many records are in the database, which when divided by the page size yields the total number of pages (a parameter that is then used in the creation of the page enumeration session bean). As shown in step 410 of FIG. 4, business component 400 obtains a database wrapper corresponding to the application properties parameter 411. A database wrapper is a database specific software component that establishes a connection to a particular type or brand of database (e.g., object database, relational database, etc.). More specifically, the database wrapper provides an application programming interface (API) for session and transaction management which allows access to a database's functionality. Using the database wrapper, a database session (step 420) and transaction (step 430) are begun, and an object factory (also referred to as a domain object factory) is obtained (step 440). The domain object factory 500 is used to query the database for page enumeration set-up information (e.g., page size), as represented by step 450 of FIG. 4 and further detailed in FIG. 5. Referring to step 520 of FIG. 5, domain object factory 500 queries database 25 and returns a vector (i.e., a collection) of domain objects. The domain object factory 500 converts (step 530) the vector of domain objects to a vector of handles, which are unique identifiers or "short-cuts" to the domain objects themselves. The creation of the page enumeration session bean is specific to the required domain object factory 500. Thus, a database session must be started (steps 610 and 620 in FIG. 7) and the domain object factory retrieved (step 630) in order to create the page enumeration session bean. Using the page-enumeration set up information and vector of handles (e.g., page size, domain object factory name, vector of handles), the page enumeration session bean 200 is created by application controller 120 (or a business component thereof) calling a create method on page enumeration home interface 220.

Figure 2:
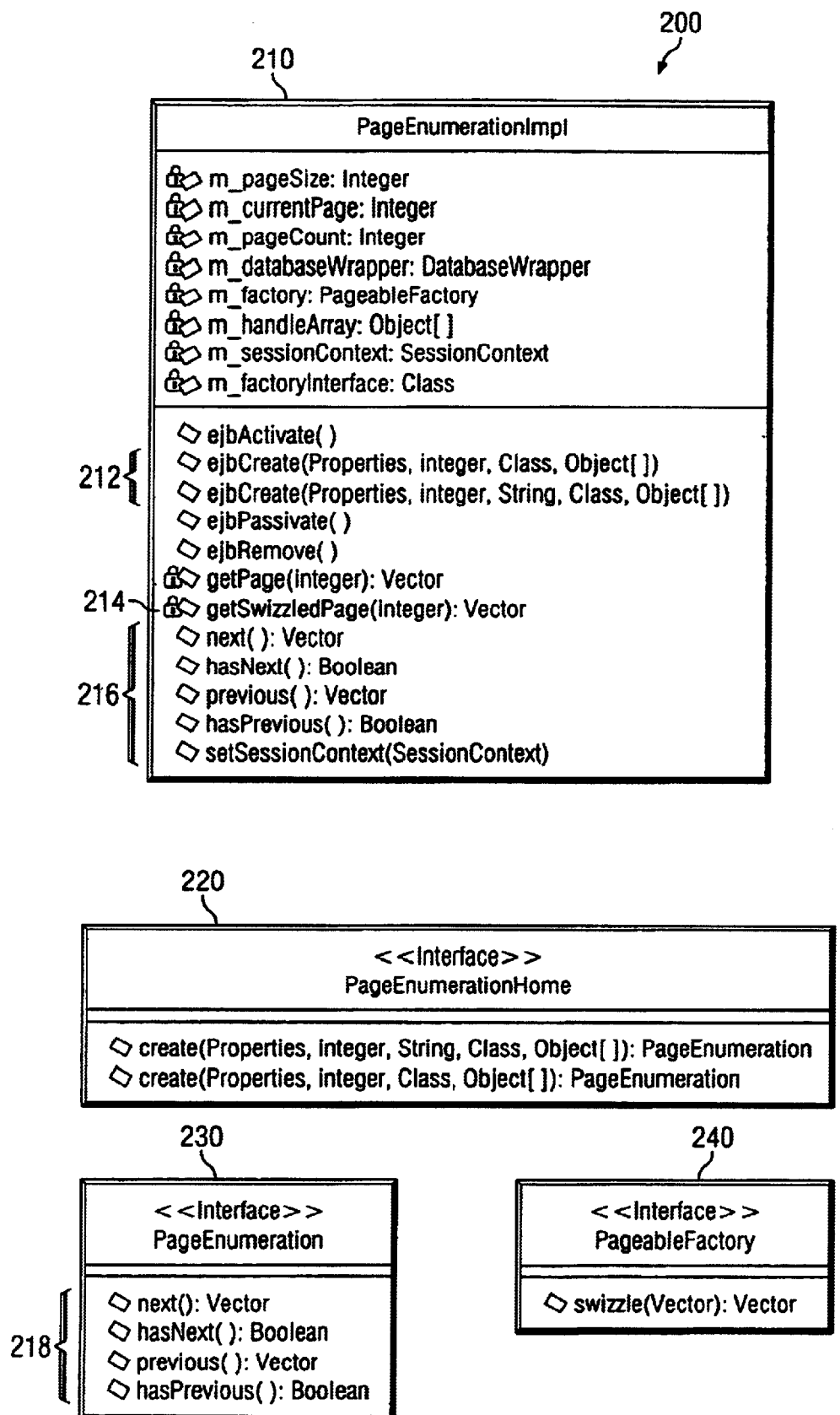
FIG. 2 is an object model, also referred to as a class diagram, of the page enumeration framework of the present invention.

Preferably, page enumeration session bean 200 is created via an instantiation of the JAVA framework comprising the classes shown in FIG. 2. As used in object technology, a class defines the methods and variables for a particular type of object; all objects of a given class are identical in form and behavior but contain different data in their variables. Accessors are the methods on a class that provide access to the variables of the class (for examples get and set commands). The methods and variables comprising each class are shown in FIG. 2, and it will be understood that these methods and variables may be modified by one skilled in the art without departing from the scope of the present invention.

Page enumeration home interface 220 is the main (i.e., public) entry point into page to enumeration framework 200, and as such page enumeration home interface is called by application 120 (via the business component) in order to use the functionality provided by the framework. An interface (also known as a message interface) is a communication surface that determines the signals (e.g., calls) that can pass through the surface; in other words, the interface defines which calls an object will respond to. That is, the interface defines the base functionality (i.e., methods) that is required for an implementation of the interface. An example of a method to create an instance of a page enumeration session bean is create(Properties appProperties, int pageSize, Class factoryInterface, Object[ ] handleArray), wherein a handle to the page enumeration bean is returned and the parameters are defined as follows:

appProps—The application properties for the database wrapper information for the application creating the page enumeration. This allows access to application-specific ini settings including which database wrapper to use to establish a database session.

pagesize—The size of each "page" of data or objects to be returned to the user.

factoryInterface—The class of the factory that will create the objects from handles or primary keys, which are abbreviated, unique identifiers that can be used to retrieve full data objects from the database. The name is obtained by calling getInterface( ) on an object factory.

handleArray—An array of handles to objects that the page enumeration session bean will manage.

In FIG. 2, create methods are shown by reference numeral 212 along with their parameters.

In a preferred embodiment, data is accessed from a relational database using TOPLink, and the method to create an instance of a TOPLink implementation of a page enumeration session bean is create(Properties appProps, int pageSize, Class factoryInterface, ReadAllQuery query), wherein a handle to the page enumeration bean is returned and the parameters are defined as follows:

appProps—The application properties for the database wrapper information for the application creating the page enumeration. This allows access to application-specific ini settings including which database wrapper to use to establish a database session.

pageSize—The size of each "page" in the page enumeration.

factoryInterface—The class of the factory that will create the objects from the handles. The name is obtained by calling getInterface( ) on a domain object factory.

query—A TOPLink ReadAliquery that is use to find the find the data and setup up a CursoredStream Upon creation of the page enumeration session bean, a handle to the bean is returned to the display servlet 30. The display servlet requests the next or previous display pages from the page enumeration session bean (as shown by steps 155 and 160 in FIG. 3) in response to user requests via user interface 100. In response to the initial call by the client/user, the next page requested by the servlet will typically be the first page. Based upon the page-enumeration set up information used in its creation, the page enumeration session bean knows the total size of the data set (e.g., the number of entries comprising the customer list), the number of entries per page (for example, one dozen), and the total number of display pages.

Figure 7:
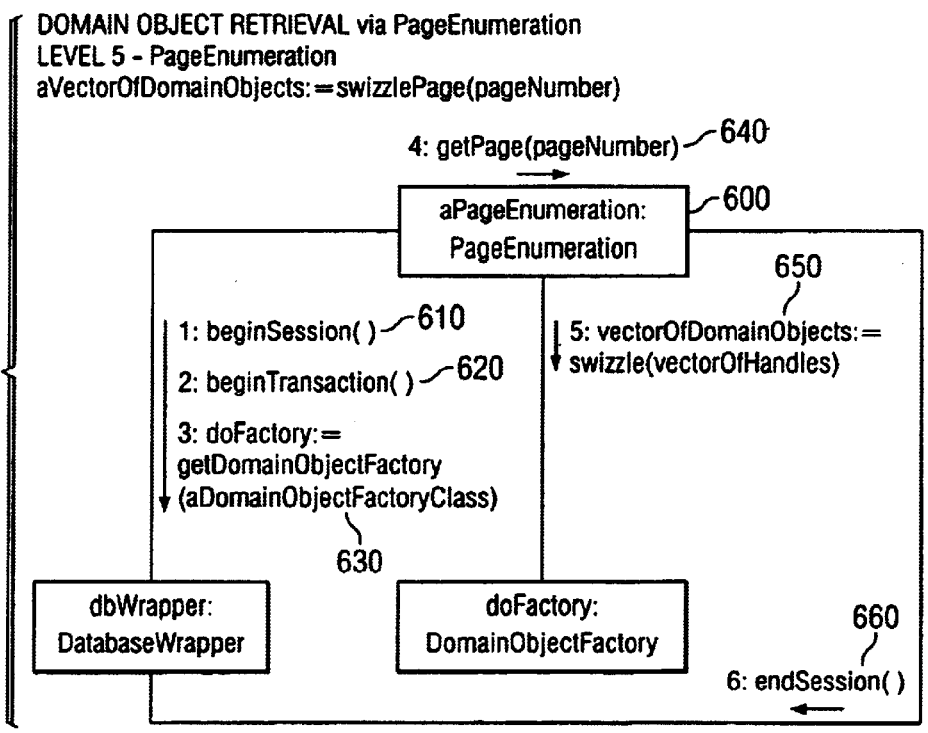
FIG. 7 is a block diagram of steps of the invention from a page enumeration perspective level.

The page enumeration session bean retrieves the data entries comprising a display page from database 25 (FIG. 1), as represented by step 640 in FIG. 7. The data entries retrieved by the page enumeration session bean are in the form of data objects. Handles are the commands (e.g., APIs) used to retrieve the data entries objects from a database. Although object handles typically operate in terms of JAVA data types, the internal object implementations can be in terms of datastore specific types. In the case of a Versant object database, the type Handle can be used for references to other objects. In the case of a relational database accessed via the TOPLink OR mapping tool, the ValueHolder type can be used to reference other objects residing in the database. A preferred framework anti method for retrieving data from a database (sometimes referred to as a persistence framework) is disclosed and claimed in U.S. patent application Ser. No. 09/579,623, filed May 26, 2000 and entitled "Computer Framework and Method for Isolating a Business Component from Specific Implementations of a Datastore." which is incorporated by reference herein in its entirety. Exemplary code using handles on an object residing in a relational database is shown in U.S. application Ser. No. 09/579,623. Alternatively, the page enumeration can retrieve data entries from the database using the cursored stream feature available from TOPLink A cursored stream is TOPLink's version of the standard JAVA input stream class and provides stream access to a query result of objects.

In summary, the page enumeration session bean retrieves data entries comprising a display page from the database using handles, which serve as "addresses" or "shortcuts" to the full data entries, all of which remain resident in the database for the duration of the database session. In other words, the page enumeration session bean knows the identity and location of the data entries comprising the entire data set (e.g., customer list) requested by the business component, but rather than pull all of the information from the database (which would result in problematic time delays), the page enumeration session bean only pulls the data entries needed to populate the current display page to be sent to the user. Upon request by the servlet, the page enumeration session bean returns an initial block of data, typically corresponding to the first page of the business component being carried out by the application controller. Using the returned block of data, the servlet creates the display page which is returned to the user via network 110. Given that the page enumeration session bean is a stateful bean and has obtained the page data from the database in the context of a database session, the page data must be made transient (that is independent of the database session) before it can be returned to the servlet.

Figure 6:
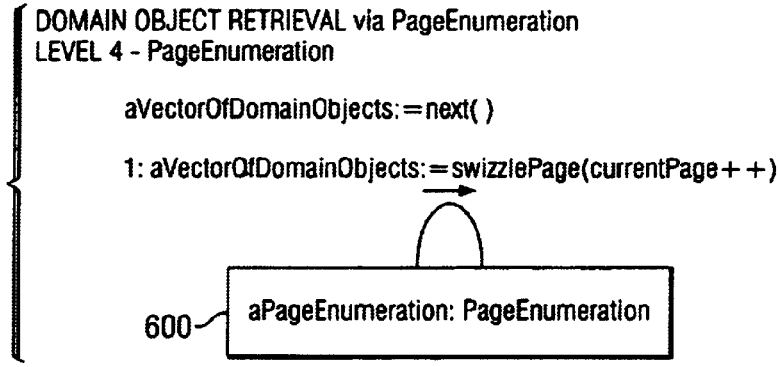
FIG. 6 is a block diagram of steps of the invention from a page enumeration A perspective level.

Data objects are considered persistent while in context of a database session and are not valid outside the database session. Therefore, the data objects comprising the page data should be made transient (i.e., independent of the database session) by the page enumeration before being passed back to the user via the display servlet. A transient object is a database neutral implementation of the object interface, as shown by reference numeral 240 in FIG. 2. As shown in FIG. 6 and step 650 of FIG. 7, the page enumeration session bean 600 calls a conversion method to make transient a vector (i.e., collection) of domain objects. The methods to convert the domain object from a persistent to a transient state (sometime referred to as a "swizzle" and shown by reference numeral 214 on FIG. 2) are commonly known to those skilled in the art, and exemplary code for such a conversion is shown in U.S. patent application Ser. No. 09/579,623, referenced previously. Upon making the data comprising the data page transient, the data page is returned to the user via display servlet 30, and network 110.

In response to the data page returned to the user, the user may request additional information from the data set by requesting that the next or previous page be displayed. As discussed previously, the user request is forwarded to the display servlet, which communicates directly with the page enumeration session bean in existence via a handle to the session bean. Given that the page enumeration bean already exists, the steps required to create the page enumeration session bean need not be repeated. As shown by steps 155 and 160 on FIG. 3, the display servlet calls next or previous methods on the page enumeration session bean, and these pagination methods are shown in FIG. 2 by reference numeral 218 on the page enumeration interface 230 and by reference numeral 216 on the page enumeration implementation class 210. Specific pagination methods include: next( ), which retrieves the next page of objects and returns a vector that contains transient objects (external implementations); hasNext( ), which answers whether a call to next( ) will succeed and should be called before attempting next( ); previous( ), which retrieves the previous page of objects and returns a vector that contains transient objects (external implementations); and hasPrevious( ), which answers whether a call to previous( ) will succeed and should be called before attempting previous( ). In a preferred embodiment, data is accessed from a relational database using TOPLink, and the pagination methods include: next( ), which retrieves the next page of objects and returns a vector that contains transient objects (external implementations); hasNext( ), which answers whether a call to next( ) will succeed and should be called before attempting next; previous( ), which retrieves the previous page of objects and returns a vector that contains transient domain objects (external implementations); hasPrevious( ), which answers whether a call to previous( ) will succeed and should be called before attempting previous( ); getFirstPage( ), which retrieves the first page of domain objects and returns a vector that contains transient objects (external implementations); getLastPage( ), which retrieves the last page of objects and returns a vector that contains transient objects (external implementations); getPage(integer), which retrieves the specified page of objects and returns a vector that contains transient objects (external implementations); getPageCount( ), which retrieves a count of the number of pages in the cursor stream on the database and returns an integer; and getRecordCount( ), which retrieves a count of the number of records in the cursor stream on the database and returns an integer.

The steps of populating a page with data, making the data transient, and returning the page to the user as described previously are repeated for each next or previous page requested by the user. Upon completion or termination by the user, the servlet calls ejbRemove on the page enumeration session bean, and the page enumeration session bean and associated database session are terminated, as shown by step 660 of FIG. 7. Should the user wish to perform another task requiring access to a large data set, the steps as described previously would be repeated for the new client/server session.

EXAMPLES

While the code examples herein are written in the JAVA programming language, which is available from Sun Microsystems Inc., it is understood that other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples.

Example 1 is exemplary code embodying the page enumeration framework as set forth in FIG. 2, and Example 2 is exemplary code embodying a preferred TOPLink implementation of the page enumeration framework for use with relational databases.

Example 1

```
public interface PageEnumeration extends EJBObject
{
    public Vector next( ) throws RemoteException;
    public boolean hasNext( ) throws RemoteException;
    public Vector previous( ) throws RemoteException;
    public boolean hasPrevious( ) throws RemoteException;
}
public interface PageEnumerationHome extends EJBHome
{
    public PageEnumeration create(Properties appProps, int pageSize,
        String dataSourceName, Class factoryInterface,
        Object[ ] handleArray )
        throws CreateException, RemoteException;
}
public class PageEnumerationImpl implements SessionBean
{
    public void ejbActivate( ) throws java.rmi.RemoteException;
    public void ejbCreate(Properties appProps, int pageSize,
        Class factoryInterface,
        Object[ ] handleArray)
        throws CreateException, RemoteException;
    public void ejbPassivate( ) throws java.rmi.RemoteException
    public void ejbRemove( ) throws java.rmi.RemoteException;
    private Vector getPage(int pageNumber);
    private Vector getSwizzledPage(int pageNumber);
    public Vector next( );
    public boolean hasNext( );
    public Vector previous( );
    public boolean hasPrevious( );
    public void setSessionContext(SessionContext sessionContext)
        throws RemoteException
} public interface PageableFactory
{
    public Vector swizzle(Vector handleVector);
}
```

Example 2

```
public Interface PageEnumerationTOPLinkImpl extends EJBObject
{
    public Vector next( ) throws RemoteException;
    public boolean hasNext ( ) throws RemoteException;
    public Vector previous( ) throws RemoteException;
    public boolean hasPrevious ( ) throws RemoteException;
    public Vector getFirstPage( ) throws RemoteException;
    public Vector getLastPage ( ) throws RemoteException;
    public Vector getPage(int) throws RemoteException;
    public int getPageCount ( ) throws RemoteException;
    public int getRecordCount ( ) throws RemoteException;
}
public interface PageEnumerationTOPLinkImplHome extends EJBHome
{
    public PageEnumeration create(Properties appProps, int pageSize,
                Class factoryInterface, ReadAllQuery query)
            throws CreateException, RemoteException;
}
public class PageEnumerationTOPLinkImplBean implements SessionBean
{
    public void ejbActivate( ) throws java.rmi.RemoteException;
    public void ejbCreate(Properties appProps, int pageSize,
                Class factoryInterface, ReadAllQuery query)
            throws CreateException, RemoteException;
    public void ejbPassivate( ) throwsjava.rmi.RemoteException
    public void ejbRemove( ) throws java.rmi.RemoteException;
```

-continued

```
    public Vector getPage(int pageNumber);
    private Vector getPageElements(int pageNumber);
    private Vector getTransientSwizzledPage(Vector page)
    public Vector next( );
    public boolean hasNext( );
    public int getPageCount( );
    public int getRecordCount( );
    public Vector getFirstPage( );
    public Vector getLastPage( )
    public Vector previous( );
    public boolean hasPrevious( );
    public void setSessionContext(SessionContext sessionContext)
            throws RemoteException
}
```

What is claimed is:

1. A method for enumerating data pages in a stateless, distributed computing environment, comprising:
   (a) calling a stateless application by a user interface, wherein sad stateless application is an Enterprise Java-Beans (EJB) compliant session bean;
   (b) invoking a stateful data structure by the stateless application, wherein said stateful data structure is an EJB compliant session bean;
   (c) retrieving from a datastore by the stateful data structure a plurality of handles corresponding to a plurality of data;
   (d) selectively retrieving data by the stateful data structure from the datastore via the handles, said data corresponding to a display pare requested by the user,
   (e) converting the stateful data residing within the stateful data structure to stateless data;
   (f) passing the stateless data to JAVA servlet;
   (g) constructing by the JAVA servlet the display page comprising the stateless data; and
   (h) returning the display page/to the user interface.

2. The method of claim 1 further comprising enumerating the plurality of handles into data pages corresponding to one or more display pages requested by the user.

3. The method of claim 2, wherein the stateless application selects the stateful data structure to be invoked via lookup in a directory, compliant of JAVA Naming and Directory Interface (JNDI).

4. The method of claim 3, wherein the stateless application invokes the stateful data structure via a domain object factory.

5. The method of claim 4, wherein the stateless application queries the datastore for initialization information and provides the initialization information to the domain object factory for invocation of the stateful data structure.

6. The method of claim 5, wherein the stateless application queries the datastore via a database wrapper.

7. The method of claim 6, wherein the datastore is an object database.

8. The method of claim 6, wherein the datastore is a relational database.

9. The method of claim 1, wherein the data comprises one or more objects.

10. The method of claim 9, wherein the data is converted from stateful to stateless via a swizzle.

* * * * *

UNITED STATES PATENT AND TRADEMARK OFFICE
CERTIFICATE OF CORRECTION

PATENT NO. : 6,856,995 B1
DATED : February 15, 2005
INVENTOR(S) : Ibitayo et al.

It is certified that error appears in the above-identified patent and that said Letters Patent is hereby corrected as shown below:

Column 9,
Line 20, replace "sad" by -- said --
Line 30, replace "pare" by -- page --

Column 10,
Line 4, delete "/" between "page" and "to"

Signed and Sealed this

Seventeenth Day of May, 2005

JON W. DUDAS
*Director of the United States Patent and Trademark Office*